(12) United States Patent
Zhu et al.

(10) Patent No.: US 12,105,587 B2
(45) Date of Patent: *Oct. 1, 2024

(54) SYSTEMS AND METHODS FOR AN ECC ARCHITECTURE WITH MEMORY MAPPING

(71) Applicant: InnoGrit Technologies Co., Ltd., Shanghai (CN)

(72) Inventors: Xiaoming Zhu, San Jose, CA (US); Jie Chen, Milpitas, CA (US); Bo Fu, Cupertino, CA (US); Zining Wu, Los Altos, CA (US)

(73) Assignee: InnoGrit Technologies Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,626

(22) Filed: Jun. 30, 2023

(65) Prior Publication Data

US 2023/0342247 A1    Oct. 26, 2023

Related U.S. Application Data

(60) Continuation of application No. 17/555,642, filed on Dec. 20, 2021, now Pat. No. 11,726,872, which is a
(Continued)

(51) Int. Cl.
| | | |
|---|---|---|
| *G06F 11/10* | (2006.01) | |
| *G06F 11/30* | (2006.01) | |
| *G06F 12/02* | (2006.01) | |

(52) U.S. Cl.
CPC ...... *G06F 11/1068* (2013.01); *G06F 11/3034* (2013.01); *G06F 12/0246* (2013.01)

(58) Field of Classification Search
CPC ............ G06F 11/1068; G06F 11/3034; G06F 12/0246; G06F 2212/1028; G06F 2212/1032; G06F 2212/7201; G06F 2212/7203; G06F 2212/7208; G06F 11/3055; G06F 11/3409; G06F 11/1048; G06F 11/10; G06F 12/0873; Y02D 10/00
(Continued)

(56) References Cited

U.S. PATENT DOCUMENTS

| | | | |
|---|---|---|---|
| 9,946,473 B2 * | 4/2018 | Thangaraj | G06F 3/0616 |
| 2008/0168241 A1 * | 7/2008 | Raghavan | G06F 13/4239 |
| | | | 711/158 |

(Continued)

*Primary Examiner* — Albert Decady
*Assistant Examiner* — Osman M Alshack
(74) *Attorney, Agent, or Firm* — IPro, PLLC

(57) ABSTRACT

A method including determining that a memory unit is available for a channel for communication between a storage controller and a non-volatile storage device, the memory unit being for temporary storage for encoded data for transmission through the channel; allocating the memory unit to that channel; and updating a memory mapping entry corresponding to the memory unit. The memory mapping entry is stored in the storage controller. Updating a memory mapping entry may be based on reading/write tasks. The memory mapping entry may indicate a cross channel status, an operation mode and an identifier of the channel. The method may include determining the channel being stuck due to memory shortage and mapping more memory units to the channel.

16 Claims, 4 Drawing Sheets

Related U.S. Application Data division of application No. 16/354,231, filed on Mar. 15, 2019, now Pat. No. 11,237,902.

(58) Field of Classification Search
USPC .......................................... 714/763, 755, 773
See application file for complete search history.

(56) References Cited

U.S. PATENT DOCUMENTS

| | | | | |
|---|---|---|---|---|
| 2013/0173997 A1* | 7/2013 | Suzumura | ............. | H03M 13/03 714/773 |
| 2014/0164730 A1* | 6/2014 | Gold | ..................... | G06F 3/0683 711/171 |
| 2015/0193302 A1* | 7/2015 | Hyun | ................... | G11C 29/028 714/764 |
| 2017/0160976 A1* | 6/2017 | Thangaraj | ........... | G06F 12/0246 |
| 2017/0371585 A1* | 12/2017 | Lazo | ................... | G06F 12/0246 |
| 2018/0314448 A1* | 11/2018 | Grossman | ............... | G06F 3/064 |
| 2019/0243775 A1* | 8/2019 | Kim | .................... | G06F 12/0246 |
| 2019/0332316 A1* | 10/2019 | Kanno | ................... | G06F 3/064 |

\* cited by examiner

SYSTEMS AND METHODS FOR AN ECC ARCHITECTURE WITH MEMORY MAPPING

TECHNICAL FIELD

The disclosure herein relates to an error correction code (ECC) architecture, particularly relates to an ECC architecture with a flexible memory mapping.

BACKGROUND

ECC has been widely used in data storage and communication systems such that user data can be recovered by a receiver or reader even when a number of errors (up to the capability of the code being used) were introduced by data corruption in transmission or on a storage. A conventional ECC architecture normally has an encoder path and a decoder path that need separate encoding buffers and decoding buffers during the encoding and decoding processes. Moreover, in multi-channel storage or communication systems, the conventional ECC architecture also need separate channel buffers to serve each channel. Therefore, there is a need in the art for an ECC architecture that can organize and utilize the resources to achieve a faster throughput and a lower power consumption.

SUMMARY

The disclosed subject matter relates to systems, methods, and devices that provide an ECC architecture with a flexible memory mapping. The flexible memory mapping may minimize total physical memory needed in an ECC architecture and also avoid copying data from one buffer to another. The physical memory may be mapped and re-mapped for different usage in different scenarios and the system performance may be boosted in different usage cases. By reducing or avoiding unnecessary data movement from one memory to another, the ECC throughput may be increased and power consumption reduced. In addition, Quality of Service (QoS) control may be implemented in some embodiments such that the memory resource may be intelligently allocated based on need without performance impact.

In an exemplary embodiment, there is provided an apparatus that may comprise an error correction code (ECC) engine, a multi-channel interface for one or more non-volatile storage devices, a memory comprising a plurality of memory units, a storage containing a plurality of mapping entries to indicate allocation status of the plurality of memory units and a memory mapping manager. The plurality of memory units may be coupled to the ECC engine and the multi-channel interface. The memory mapping manager may be configured to control allocation of the plurality of memory units and set allocation status in the plurality of mapping entries.

In another exemplary embodiment, there is provided a method comprising: receiving a memory request for a read or write task for a channel from an encoding task control or a decoding task control, checking an overall memory usage and a memory usage for the channel, determining that the memory request needs immediate execution and a memory unit of a plurality of memory unit is available, allocating the memory unit to that channel, updating a memory mapping entry corresponding to the memory unit and issuing the memory unit to the encoding or decoding task control.

DETAILED DESCRIPTION

Figure 1:
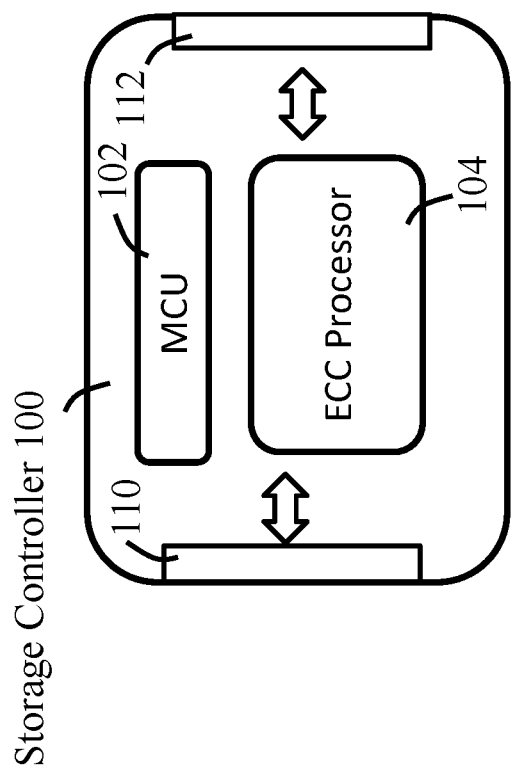
FIG. 1 schematically shows a non-volatile storage controller in accordance with an embodiment of the present disclosure.

Specific embodiments according to the present disclosure will now be described in detail with reference to the accompanying figures. Like elements in the various figures are denoted by like reference numerals for consistency.

The present disclosure provides apparatuses, systems and methods that support various high-speed non-volatile memories (NVMs) and any combination of various NVMs. As used herein, a non-volatile memory device may be a computer storage device that can maintain stored information after being powered off, and the stored information may be retrieved after being power cycled (turned off and back on). Non-volatile storage devices may include floppy disks, hard drives, magnetic tapes, optical discs, NAND flash memories, NOR flash memories, Magnetoresistive Random Access Memory (MRAM), Resistive Random Access Memory (RRAM), Phase Change Random Access Memory (PCRAM), Nano-RAM, etc. In the description, a NAND flash may be used an example for the proposed techniques. However, various embodiments according to the present disclosure may implement the techniques with other kinds of non-volatile storage devices.

FIG. 1 schematically shows an exemplary non-volatile storage controller 100 according to an embodiment. The non-volatile storage controller 100 may comprise a first interface 110, a second interface 112, a microcontroller unit (MCU) 102 and an ECC processor 104. The first interface 110 may be any existing or yet to be developed interface that is configured to couple the non-volatile storage controller 100 to a system bus of a host computing system, and receive data from and transmit data to the host computing system. In one embodiment, for example, the first interface 110 may be a host interface controller (e.g., Serial Advanced Technology Attachment (SATA), Serial Attached SCSI (SAS), PCIe, etc.). The second interface 112 may be any existing or yet to be developed interface that is configured to couple a storage controller to one or more non-volatile storage devices. In one embodiment, the second interface 112 may be a multi-channel interface that may be configured to transfer encoded data (e.g., ECC codewords) over multiple channels in parallel. For example, the second interface 112 may be an Open NAND Flash Interface (ONFI) that may support different protocols (e.g., Non-volatile Double Data Rate (NVDDR), NVDDR Type 2 (NVDDR2,) NVDDR Type Three (NVDDR3), and Toggle protocols) and run at different transfer speeds.

The MCU 102 may be a computer processor configured to execute executable instructions (e.g., software or firmware). In various embodiments, the MCU 102 may be a microprocessor, a microcontroller, a field-programmable gate array (FPGA), or an application-specific IC (ASIC). The ECC processor 104 may comprise one or more ECC encoders to encode the data into codewords to be stored in NVMs and one or more ECC decoders to decode codewords retrieved from the NVMs.

Figure 2:
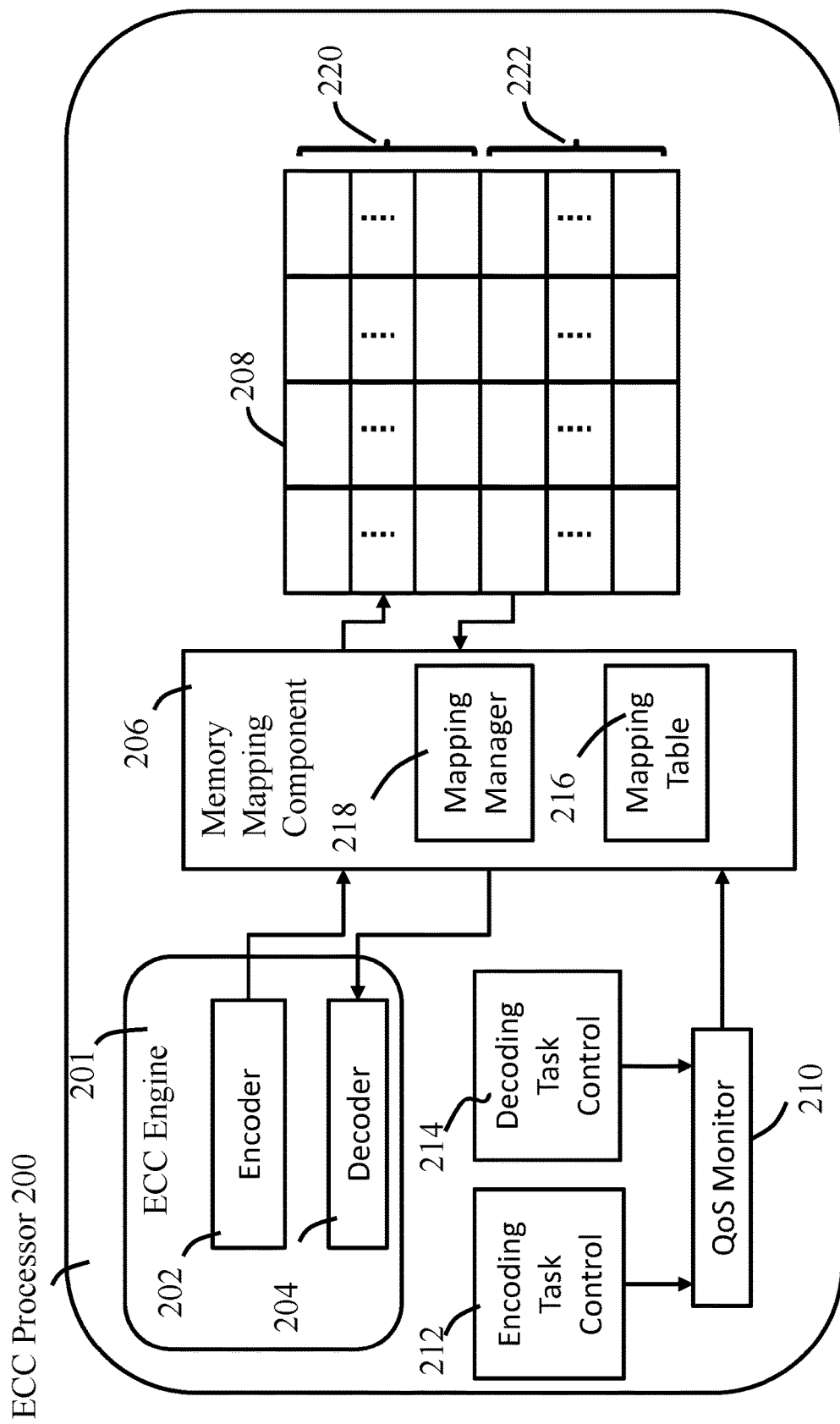
FIG. 2 schematically shows an ECC processor in accordance with an embodiment of the present disclosure.

FIG. 2 schematically shows an ECC processor 200 in accordance with an embodiment of the present disclosure. The ECC processor 200 may be an embodiment of the ECC processor 104, and the various components of the ECC processor 200 described herein may be implemented in FPGA, ASIC, or a combination of FPGA and ASIC. The ECC processor 200 may comprise an ECC engine 201, and a memory mapping component 206, a memory 208 and a Qos monitor 210. The ECC engine 201 may comprise an encoder 202 and a decoder 204. The encoder 202 may represent one or more encoders and the decoder 204 may represent one or more decoders in the ECC processor 200. The memory 208 may comprise a plurality of memory units. In some embodiments, the size of a memory unit may be chosen to be at least the size of an ECC codeword. For example, if the encoder 202 and decoder 204 are configured for one particular size of codewords, then the size of memory unit may be this particular size. If there are multiple encoders 202 and multiple decoders 204 that are configured for two or more different sizes of codewords, then a largest codeword size of the different sizes may be chosen for the size of memory unit. Although in the embodiment shown in FIG. 2, the ECC engine 201 may comprise the encoder 202 and decoder 204, in some embodiments, the ECC engine 201 may only comprise one or more encoders or one or more decoders but not both encoder(s) and decoder(s).

In an embodiment, the memory units of the memory 208 may be logically divided into two portions: a NAND data portion 220 and an error recovery data buffer portion 222. The NAND data portion 220 may include K pieces of memory units and the error recovery data buffer portion 222 may include R pieces of memory units. K and R may be any suitable number and may be determined based on the number of channels. For example, an embodiment of the ECC processor 200 for a 4-channel NAND storage system may have a memory 208 with K being 12 and R being 8 (20 memory units in total). It should be noted that the logical division may be optional and the memory 208 without such a logical division may implement all techniques described herein in an embodiment.

The memory mapping component 206 may include a mapping storage 216 and a memory mapping manager 218. The memory 208 may be coupled to the encoder 202 and decoder 204 via the memory mapping component 206. The mapping storage 216 may contain a data structure that have a plurality of mapping entries to indicate the allocation status of the memory 208. The data structure may be implemented in any suitable format, such as but not limited to, a mapping table. In one embodiment, each mapping entry in the data structure may correspond to one memory unit of the memory 208 such that the value in a mapping entry may indicate the allocation status of the corresponding memory unit. In another embodiment, each mapping entry in the data structure may correspond to two or more memory units of the memory 208 such that the value in a mapping entry may indicate the allocation status of the two or more corresponding memory units. Some examples herein may use one mapping entry corresponding to one memory unit to illustrate the features of the various embodiments. These features are also applicable in embodiments that one mapping entry may correspond to multiple memory units.

The allocation status maintained in each mapping entry may include a plurality pieces of information, including but not limited to, for which channel is the corresponding memory unit used, and whether the corresponding memory unit is used in an encoding, decoding, or error recovery operation mode. For example, during operation, a memory unit may be allocated for a channel for encoding when there is a write task to be performed for the channel and the memory unit may store a codeword generated by the encoder 202 and to be written to the channel. The memory unit or another memory unit may be allocated for a channel for decoding when there is a read task (or retry task if there is an error in a preceding decoding process) and the memory unit may store a codeword retrieved from the channel and to be decoded by the decoder 204.

In some embodiments, a codeword may be cross channel. As used herein, a cross channel codeword may be divided into pieces and distributed to a plurality of channels during a program (write) operation with one piece to a separate channel and assembled from the pieces read from the plurality of channels during a read operation. In these embodiments, the allocation status may also include information indicating whether the codeword in the corresponding memory unit is cross channel.

The memory mapping entry format may differ from one application to another application. In an embodiment that supports cross channel, one exemplary mapping entry may be include three fields: FMT, MODE, CH. The FMT field may indicate a cross channel status. An exemplary FMT field may have two bits, for example, 00 indicating single channel (e.g., there is no cross channel for the codeword in the corresponding memory unit), 01 indicating the codeword in the corresponding memory unit may be distributed in two channels, 10 indicating the codeword in the corresponding memory unit may be distributed in four channels, and 11 indicating the codeword in the corresponding memory unit may be distributed in all channels. The MODE field may indicate an operation mode. An exemplary MODE field may have two bits, for example, 00 indicating decoding, 01 indicating encoding, 10 indicating error recovery and 11 indicating a Reserved status. In an embodiment, the MODE "11" be reserved for a future usage. For example, a memory unit may be fixed for a particular usage (e.g., decoding/encoding/error recovery) without being re-assigned. In some embodiments, the MODE field may have more than 2 bits. The CH field may include a channel identifier (CH ID) indicating the channel associated with the codeword in the corresponding memory unit. The width of the CH field may depend on the number of channels in a multi-channel NAND storage system. For example, in some embodiments, the CH field may have a width of 2 bits for a four channel NAND storage system and a width of 3 bits for an eight channel NAND storage system.

Each memory unit of the memory 208 may be allocated to any channel for any operation mode, and the allocation status may be dynamically changed during operations. The allocation and change of allocation status may be referred to as physical memory mapping and re-mapping, which may be equivalent to and performed by updating the mapping entries. The memory mapping manager 218 may be a control sub-module that may allocate and release memory units and also control the memory mapping.

In some embodiments, the ECC processor 200 may further comprise a quality of service (QoS) monitor 210, an encoding task control 212 and a decoding task control 214. The memory mapping component 206 may allocate memory units and issue the allocated memory units to the encoding task control 212 and the decoding task control 214. The encoding task control 212 may be a write control block that is configured to control all write tasks and provide the allocated memory units (e.g., in encoding operation mode) to the encoder 202 and NAND interface 112 to accomplish the write tasks. The decoding task control 214 may be a read control block that is configured to control all read tasks and provide the allocated memory units (e.g., in encoding operation mode and error recovery mode) to the decoder 204 and NAND interface 112 to accomplish the read tasks. It should be noted that in an embodiment with only encoder(s), the decoding task control 214 may not be necessary. Moreover, in an embodiment with only decoder(s), the encoding task control 212 may not be necessary.

Each memory unit may have an idle or busy status, which may be maintained by the memory mapping component 206. In one embodiment, this idle or busy status may be stored in the memory mapping storage 216 in addition to the mapping information. In another embodiment, the idle or busy status may be stored in a separate memory status table. Once a piece of memory is assigned (or allocated) for a memory request (e.g., an encoding/decoding task control allocate request), the memory mapping manager 218 may set the status of that piece of memory to busy. Busy memory cannot be re-assigned until it becomes idle. The memory mapping manager 218 may set the status of a memory unit to idle upon a release request is received (e.g., encoding/decoding release request). In some embodiments, the memory assignment by the memory mapping manager 218 may be a prioritized assignment. For example, if a piece of memory is pre-set for decoding, then a decoding task may have a higher priority to use this piece of memory than an encoding task.

In an embodiment, the encoding task control 212 may have a queue for all pending write tasks, and the decoding task control 214 may have a queue for all pending read tasks and a queue for pending retry tasks. The QoS monitor 210 may be configured to determine memory mapping update. In an embodiment, the QoS monitor 210 may determine memory mapping update based on one or more criteria. The exemplary criteria may include, but not limited to, a total number of pending read tasks, a total number of pending write tasks, next expected task from NAND (read or write), pending retry tasks, idle channel, 4K random read, traffic congestion, and sequential write, etc. It should be noted that if certain conditions are met in the QoS monitor 210, a memory unit may be re-assigned from decoding task to encoding task or vice versa if the status of the memory unit is idle.

A plurality of operations may be implemented to set or modify the values in the mapping entries. An "init" operation may be an exemplary operation to initialize the whole data structure by assigning a respective initial value to each mapping entry. This may be equivalent to allocate the memory 208 according to an initial configuration. For example, in an initial configuration, all memory units of the memory 208 may be divided among all the channels, with each channel have one or more memory units for encoding, one or more memory units for decoding and one or more memory units for error recovery.

After a memory unit has been allocated for a certain usage (e.g., after an initialization), its allocation status may be changed on the fly and several operations may be implemented to achieve memory mapping and re-mapping on the fly. A "set" operation may be one exemplary operation of on the fly re-mapping to set a particular value to a mapping entry. For example, initially each of the memory units of the memory 208 may be allocated for a particular usage (e.g., when the system is just powered on), an "init" operation may set each mapping entry with an initial value according to the allocation status of the corresponding memory unit. During operation, situations often occur that the initial allocation need to be changed. Some example situations may be related to read and write traffic demands. For example, there may be a read operation to read data from one channel and the data to be transferred in that channel may exceed the memory initially allocated to that channel. One or more memory units initially allocated for other usage (e.g., encoding or error recovery for that channel, or any operation mode for other channels) may be dynamically re-allocated to that channel for read so that the channel may avoid being stuck and the mapping entries corresponding to the one or more dynamically re-allocated memory units may be "set" to read (e.g., decoding operation mode) for that channel. In some embodiments, the dynamical re-allocation may depend on whether a memory unit is idle. In one embodiment, if there is a program command (e.g., to write data to NVM) after the read command, one or more memory units allocated to read for that channel may be immediately mapped to the encoding operation mode for the channel and used for codewords to be written to the channel. In embodiments that implement "reserved" for certain usage, then a memory unit may be reserved for that particular usage. For example, one embodiment may implement "reserved" by having a bit in the mapping entry to indicate this "reservation" status and a memory unit may be fixed for that particular usage and cannot be re-assigned to a different usage.

Sometimes, there may be read and write command both issued for a channel. In one embodiment, the read command may be satisfied first so the overall system seems to be responsive while the write command may be carried out after the read command. That is, memory units may be first allocated to perform the read command and then re-allocated to perform the program command. Moreover, some read or write tasks may have some specific memory usage demands. For example, a 4K read task may need some memory units allocated to decoding operation mode such that codewords received from channel interface may be buffered without blockage. In contrast, a sequential write task may need some memory units allocated to encoding operation mode such that codewords generated by the encoder may be buffered without blockage. In these usage cases, the "set" operation may be used on the mapping entries to accomplish the mapping and re-mapping of the memory units.

A "swap" operation may be another exemplary operation of on the fly re-mapping to swap values of two mapping entries. For example, after an "init" operation, a first memory unit may be allocated for a decoding operation mode for a particular channel, and a second memory unit may be allocated for an error recovery mode for the particular channel. During operation, the decoder 204 may fail to successfully decode the codeword stored in the first memory unit in a first try and the codeword may have to be decoded again (e.g., a retry using a more powerful decoder) via an error recovery process. The first memory unit may then be re-mapped to the error recovery mode without actually copying the codeword from the first memory unit to another memory unit (e.g., the second memory unit) and the second memory unit may be allocated for decoding thus the first memory unit and the second memory unit may have their operation mode swapped without actually moving data between them. In general, because the memory 208 is shared by all channels and all encoders and decoders, moving a codeword from one decoder buffer to another decoder buffer may be avoided when switching from one decoder to another decoder. In an embodiment with logical division of the memory 208, the first memory unit may be allocated from the NAND data portion 220 and the second memory unit may be allocated from the error recovery data buffer portion 222.

Another exemplary operation may be a "reset" operation to reset the value of a mapping entry to an initial allocation status. In an embodiment, some of the operations, for example, init, set and reset, may be batch operations such that one operation may be applied to two or more mapping entries in a batch.

An exemplary allocation work flow may start with the memory mapping manager 218 receive a memory request for memory resource when there is a read or write task for a channel. The memory mapping manager 218 may check both the overall memory usage and the memory usage by that channel. The channel memory usage may refer to active memory usage, e.g., memory units that are busy and assigned to that channel. The overall memory usage may be the sum of all channel memory usage. It should be noted that when a memory unit is in busy status, mapping information indicates the current memory usage of the memory unit. However, if a memo unit is reserved, it can only be used according to the mapping information. Moreover, in some situations the mapping entry may be different from active status. For example, the memory mapping may indicate a pre-assigned status (e.g., pre-assigned to CHO for decoding) of a memory unit. Then a decoding task (e.g., a CHO decoding task) has a higher priority may use this memory unless the QoS monitor 210 or the memory mapping manager 218 changes this mapping entry.

In some embodiments, a queue may be implemented in the memory mapping component 206 such that the memory mapping manager 218 may compare the memory request with any existing request in the queue when the request is received. The memory mapping manager 218 may push the request into the queue if the request does not need immediate execution (e.g., not of a high priority). If the memory mapping manager 218 determines that the request needs immediate execution (e.g., a high priority), one or more memory unit may be allocated to that channel given that one or more empty memory units may be available. In some embodiments, an active status for each of the plurality of memory units of the memory 208 may also be maintained by the memory mapping component 206. For example, in one embodiment, the memory mapping manager 218 may maintain a data storage that includes a plurality of active status entries. Each active status entry may be an active bit corresponding to a memory unit to indicate whether the memory unit is idle or busy. If there are available memory unit(s) to be allocated, the memory mapping manager 218 may allocate one or more memory units to the channel and update the mapping entries corresponding to the one or more allocated memory units. The allocated one or more memory units may be issued to the read or write control block (e.g., the encoding task control 212 and the decoding task control 214).

An exemplary memory release work flow implemented by the memory mapping manager 218 may start with the memory mapping manager 218 receive a memory release request from the read or write control block for an already allocated memory unit. The memory mapping manager 218 may clear the memory mapping entry corresponding to this already allocated memory unit and update an overall memory availability.

Figure 3A:
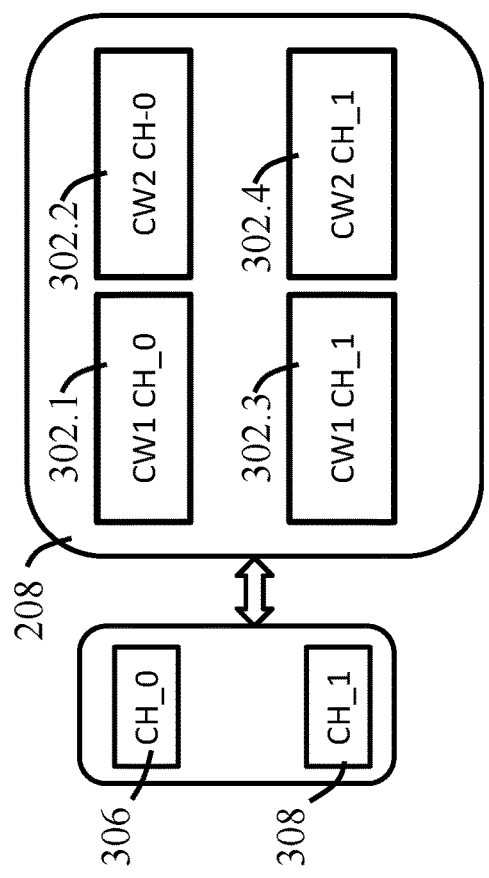
FIG. 3A schematically shows a memory mapping in accordance with an embodiment of the present disclosure.

FIG. 3A schematically shows a single channel memory mapping in accordance with an embodiment of the present disclosure. The memory units 302.1 through 302.4 may be a portion of the memory 208. Two memory units 302.1 and 302.2 may be allocated to a channel denoted as CH_0 306 for a read task. The memory unit 302.1 may hold a codeword from CH_0 306 denoted as CW1 CH_0 and the memory unit 302.2 may hold another codeword from CH_0 denoted as CW2 CH_0. Two memory units 302.3 and 302.4 may be allocated to another channel denoted as CH_1 308 for a read task. The memory unit 302.3 may hold a codeword from CH_1 308 denoted as CW1 CH_1 and the memory unit 302.4 may hold another codeword from CH_1 denoted as CW2 CH_1. Allocation status of the memory units 302.1 through 302.4 may be indicated by mapping entries 304.1 through 304.4, respectively. In an embodiment with an exemplary mapping entry structure {FMT, MODE, CH}, the memory mapping entries 304.1 and 304.2 may have FMT as "00" indicating a single channel, MODE as "00" indicating decoding and CH as "00" indicating CH_0 306. The memory mapping entries 304.3 and 304.4 may have FMT as "00" indicating a single channel, MODE as "00" indicating decoding and CH as "01" indicating CH_1 308. Therefore, the codewords in the memory units 302.1 through 302.4 are single channel codewords. That is, each of the codewords in the memory units 302.1 through 302.4 is from one channel.

Figure 3B:
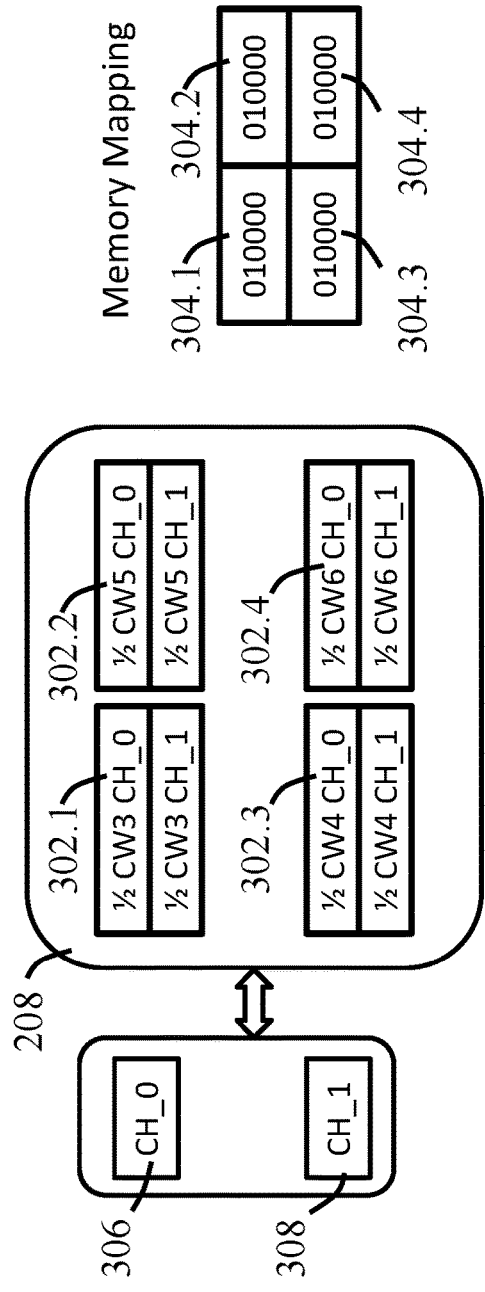
FIG. 3B schematically shows another memory mapping in accordance with an embodiment of the present disclosure.

FIG. 3B schematically shows a cross channel memory mapping in accordance with an embodiment of the present disclosure. In contrast to FIG. 3A, each of the memory units 302.1 through 302.4 in FIG. 3B may be allocated to a read task from a virtual channel that may comprise the physical channels CH_0 306 and CH_1 308. As shown in FIG. 3B, each of the memory units 302.1 through 302.4 may hold a codeword with half of the codeword read from CH_0 306 and another half of the codeword read from CH_1 308. For example, the memory unit 302.1 shown in FIG. 3B may contain a codeword CW3 with one half of codeword CW3 from CH_0 306 and the other half of codeword CW3 from CH_1 308; the memory unit 302.3 shown in FIG. 3B may contain a codeword CW4 with one half of the codeword CW4 from CH_0 306 and the other half of the codeword CW4 from CH_1 308; the memory unit 302.2 shown in FIG. 3B may contain a codeword CW5 with one half of codeword CW5 from CH_0 306 and the other half of the codeword CW5 from CH_1 308; the memory unit 302.4 shown in FIG. 3B may contain a codeword CW6 with one half of the codeword CW6 from CH_0 306 and the other half of the codeword CW6 from CH_1 308.

Moreover, as shown in FIG. 3B, the memory mapping entries 304.1 through 304.4 may each have FMT as "01" indicating a two-channel cross channel codeword, MODE as "00" indicating decoding and CH as "00" indicating the channel ID of the virtual channel. Therefore, the codewords in the memory units 302.1 through 302.4 may be cross channel codewords. That is, each of the codewords in the memory units 302.1 through 302.4 is from a virtual channel that may comprise two channels. It should be noted that 4 channel and all channel cross channel codewords may be stored in a memory unit similar to the example of a two channel codeword.

The single channel mapping of FIG. 3A and cross channel mapping of FIG. 3B may also be used for a write task similar to the read task, with codeword data going into the channel(s) (or virtual channel) instead of coming from the channel(s) (or virtual channel).

Figure 4:
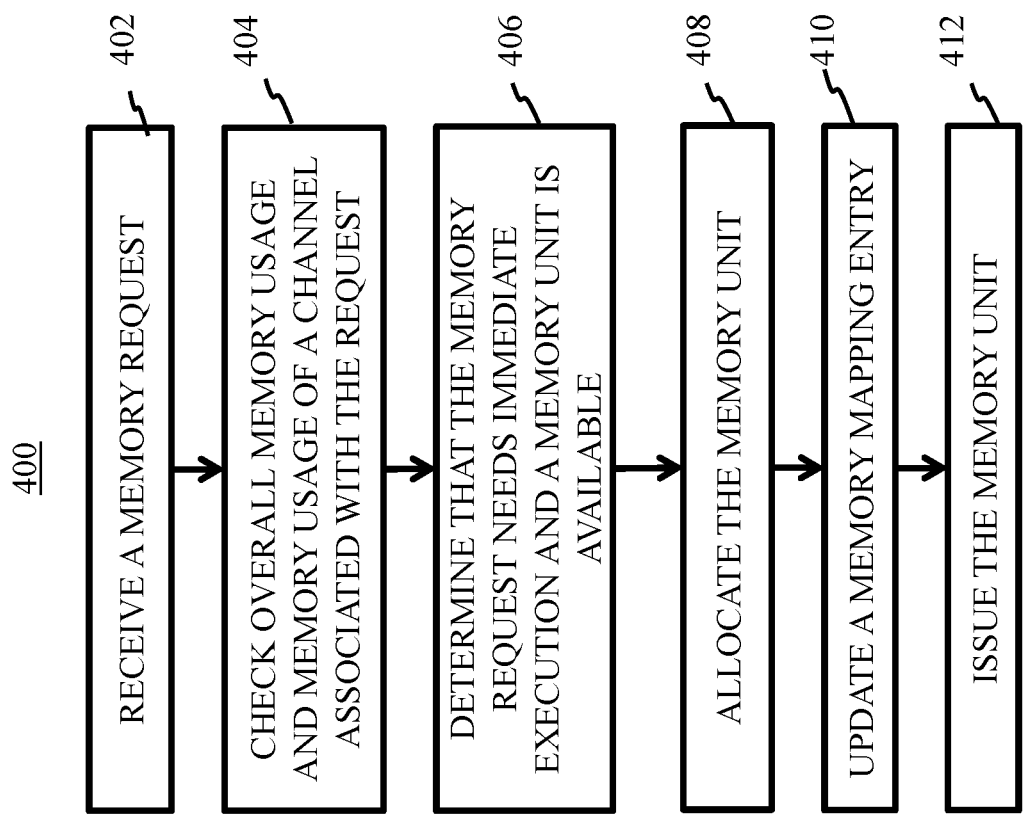
FIG. 4 is a flowchart of a process for allocating memory in accordance with an embodiment of the present disclosure.

FIG. 4 is a flowchart of a process 400 for allocating memory in accordance with an embodiment of the present disclosure. The process 400 may be implemented by an embodiment of the ECC processor 200 using hardware (e.g., a field-programmable gate array (FPGA) or an application-specific IC (ASIC), firmware, or any suitable combination.

At block 402, a memory request may be received. For example, when there is a read or write task for a channel, a memory request may be generated at a read or write control block (e.g., the encoding task control 212 and the decoding task control 214) and sent to the mapping manager 218. In one embodiment, the memory request may be received at the QoS monitor 210 and the QoS monitor 210 may apply a quality of service check before the memory request may be forwarded to the mapping manager 218. At block 404, an overall memory usage and a memory usage of the channel associated with the memory request may be checked. In an embodiment, the memory mapping manager 218 may check both the overall memory usage and the memory usage by that channel. At block 406, it may be determined that the memory request needs immediate execution and a memory unit is available. For example, the memory mapping manager 218 may check with the QoS monitor 210 and determine that the memory request has a high priority and needs immediate execution, and at least one memory unit may be available (e.g., idle). At block 408, the available memory unit may be allocated. At block 410, the memory mapping entry corresponding to the allocated memory unit may be updated. At block 412, the allocated memory unit may be issued to the read or write control block (e.g., the encoding task control 212 and the decoding task control 214). In an embodiment, the encoding task control 212 and the decoding task control 214 may have queues for pending read and write tasks, and the issued memory unit may be used to accomplish one of the read or write tasks.

Embodiments according to the present disclosure may implement a flexible memory mapping to minimize total physical memories needed in an ECC architecture. For example, in a traditional ECC architecture with n-stage pipelined design with n being a positive integer larger than 1, either encoding or decoding path for each channel needs n codeword (CW) buffers (e.g., n memory units) to support the required throughput on either read or write, and thus the traditional ECC architecture require a total of 2n CW buffers per channel. However, using flexible memory mapping, an embodiment may need only n CW buffers to support the required read and write throughput for each channel. For example, the NVM may be either in read or write status, but not both. These n CW buffers may be mapped to either encoding path or decoding path depending usage demand and a 50% save in memory usage per channel may be achieved.

In some embodiments, the usage demand may be determined and fulfilled by Qos monitoring. With flexible memory mapping, physical memories may be mapped and re-mapped for different usage in different scenario. Performance may be boosted based on usage case and usage priority. Moreover, data movement from one memory location to another in a conventional ECC architecture become unnecessary and avoided. ECC throughput may be increased and power consumption may be reduced. For example, in an ECC architecture with multiple decoders, a codeword failed by one decoder is typically retried by another decoder and the codeword has to be moved to the corresponding decoder buffers to continue decoding in conventional ECC architecture. In a 10% CW failure rate, this kind of data movement may cause about 2-3% throughput loss in the conventional ECC architecture. Data movement because of switching between different decoders is not necessary and avoided in embodiments according to the present disclosure.

In an exemplary embodiment, there is provided an apparatus that may comprise an error correction code (ECC) engine, a multi-channel interface for one or more non-volatile storage devices, a memory comprising a plurality of memory units, a storage containing a plurality of mapping entries to indicate allocation status of the plurality of memory units and a memory mapping manager. The plurality of memory units may be coupled to the ECC engine and the multi-channel interface. The memory mapping manager may be configured to control allocation of the plurality of memory units and set allocation status in the plurality of mapping entries.

In an embodiment, the apparatus may further comprise an encoding task control. The ECC engine may comprise at least one ECC encoder, and the encoding task control may be configured to control write task(s) and provide a set of one or more memory units of the plurality of memory units to the at least one ECC encoder and the multi-channel interface to accomplish the write task(s).

In an embodiment, the apparatus may further comprise a decoding task control. The ECC engine may comprise at least one ECC decoder, and the decoding task control may be configured to control read task(s) and provide a set of one or more memory units of the plurality of memory units to the at least one ECC decoder and the multi-channel interface to accomplish the read task(s).

In an embodiment, the apparatus may further comprise an encoding task control, a decoding task control and a quality of service (QOS) monitor configured to determine memory mapping update. The encoding task control may be configured to control write task(s) and provide a first set of one or more memory units of the plurality of memory units to the at least one encoder and the multi-channel interface to accomplish the write task(s). The decoding task control may be configured to control read task(s) and provide a second set of one or more memory units of the plurality of memory units to the at least one decoder and the multi-channel interface to accomplish the read task(s).

In an embodiment, the Qos monitor may be configured to determine memory mapping update based on one or more criteria is selected from a group including: a total number of pending read tasks, a total number of pending write tasks, next expected task from the one or more non-volatile storage devices, pending retry tasks, idle channel, 4K random read, traffic congestion, and sequential write.

In an embodiment, the memory mapping manager may be further configured to receive a memory request for a read or write task for a channel, check an overall memory usage and a memory usage for the channel, determine that the memory request needs immediate execution and a memory unit of the plurality of memory units is available, allocate the memory unit to that channel, update a memory mapping entry corresponding to the memory unit; and issue the memory unit to the encoding or decoding task control.

In an embodiment, the memory mapping manager may be further configured to receive a memory release request from the encoding or decoding task control for an already allocated memory unit, clear a memory mapping entry corresponding to the already allocated memory unit and update an overall memory availability.

In an embodiment, a memory mapping entry of the plurality of memory mapping entries may contain a first field indicating a cross channel status, a second field indicating an operation mode and a third field indicating a channel.

In an embodiment, the cross channel status may indicate whether a codeword in a corresponding memory unit is stored in one channel or multiple channels of the one or more non-volatile storage devices.

In an embodiment, the third field may indicate a virtual channel that comprises two or more channels when the codeword in the corresponding memory unit is stored in multiple channels.

In an embodiment, the apparatus may further comprise an active status storage that stores active status for each of the plurality of memory units. The memory mapping manager may be further configured to allocate a memory unit of the plurality of memory units based on an active status of the memory unit.

In an embodiment, the ECC engine may include a first ECC decoder and a second ECC decoder, and the memory mapping manager may be further configured to dynamically map a memory unit allocated to the first ECC decoder to the second ECC decoder by setting a corresponding memory mapping entry.

In another exemplary embodiment, there is provided a method comprising: receiving a memory request for a read or write task for a channel from an encoding task control or a decoding task control, checking an overall memory usage and a memory usage for the channel, determining that the memory request needs immediate execution and a memory unit of a plurality of memory unit is available, allocating the memory unit to that channel, updating a memory mapping entry corresponding to the memory unit and issuing the memory unit to the encoding or decoding task control.

In an embodiment, the method may further comprises maintaining a write task queue for write task(s), maintaining a read task queue for read task(s), and determining memory mapping update by using one or more criteria selected from a group including: a total number of pending read tasks, a total number of pending write tasks, next expected task from one or more non-volatile storage devices, pending retry tasks, idle channel, 4K random read, traffic congestion, and sequential write.

In an embodiment, the method may further comprise receiving a memory release request from the encoding or decoding task control for an already allocated memory unit, clearing a memory mapping entry corresponding to the already allocated memory unit, and updating an overall memory availability.

In an embodiment, the memory mapping entry may contain a first field indicating a cross channel status, a second field indicating an operation mode and a third field indicating an identifier of the channel.

In an embodiment, the cross channel status may indicate whether a codeword in the memory unit is stored in one channel or multiple channels of one or more non-volatile storage devices.

In an embodiment, the third field may indicate a virtual channel that comprises two or more channels when the codeword in the memory unit is stored in multiple channels.

In an embodiment, the method may further comprise maintaining an active status for the memory unit. The memory unit may be available when its active status is idle.

In an embodiment, the method may further comprise dynamically mapping the memory unit allocated to a first decoder to a second decoder by setting the memory mapping entry.

In an embodiment, the method may further comprise determining the channel being stuck at a read data transfer or a write data transfer due to memory shortage and mapping more memory unit(s) to the channel to reduce channel blockage.

In an embodiment, the method may further comprise determining the channel having released one or more memory units allocated for reducing the channel blockage and remapping the one or more memory units to a different task to allow the different task start transferring immediately.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
determining that a memory unit of a plurality of memory units of a storage controller is available for a channel of the storage controller, wherein the channel is configured to allow communication between the storage controller and a non-volatile storage device and the plurality of memory units are configured to provide temporary storage for encoded data to be transmitted to the non-volatile storage device through the channel or transmitted from the non-volatile storage device through the channel;
allocating the memory unit to that channel;
updating a memory mapping entry corresponding to the memory unit, wherein the memory mapping entry is stored in the storage controller;
maintaining a write task queue for write task(s);
maintaining a read task queue for read task(s); and
determining memory mapping update by using one or more criteria selected from a group including: a total number of pending read tasks, a total number of pending write tasks, next expected task from one or more non-volatile storage devices, pending retry tasks, idle channel, 4K random read, traffic congestion, and sequential write.

2. The method of claim 1, further comprising:
releasing the allocated memory unit by clearing a memory mapping entry corresponding to the allocated memory unit.

3. The method of claim 1, wherein the memory mapping entry contains a first field indicating a cross channel status, a second field indicating an operation mode and a third field indicating an identifier of the channel.

4. The method of claim 3, wherein the cross channel status indicates whether a codeword in the memory unit is stored in one channel or multiple channels of one or more non-volatile storage devices.

5. The method of claim 4, wherein the third field indicates a virtual channel that comprises two or more channels when the codeword in the memory unit is stored in multiple channels.

6. The method of claim 1, wherein the memory mapping entry further comprises an active status for the memory unit, the active status indicating whether the memory unit is available.

7. The method of claim 1, further comprising:
determining the channel being stuck at a read data transfer or a write data transfer due to memory shortage; and
mapping more memory unit(s) to the channel to reduce channel blockage.

8. A method, comprising:
determining that a memory unit of a plurality of memory units of a storage controller is available for a channel of the storage controller, wherein the channel is configured to allow communication between the storage controller and a non-volatile storage device and the plurality of memory units are configured to provide temporary storage for encoded data to be transmitted to the non-volatile storage device through the channel or transmitted from the non-volatile storage device through the channel;
allocating the memory unit to that channel; and
updating a memory mapping entry corresponding to the memory unit, wherein the memory mapping entry is stored in the storage controller;
wherein the memory mapping entry contains a first field indicating a cross channel status, a second field indicating an operation mode and a third field indicating an identifier of the channel.

9. The method of claim 8, further comprising:
releasing the allocated memory unit by clearing a memory mapping entry corresponding to the allocated memory unit.

10. The method of claim 8, wherein the cross channel status indicates whether a codeword in the memory unit is stored in one channel or multiple channels of one or more non-volatile storage devices.

11. The method of claim 10, wherein the third field indicates a virtual channel that comprises two or more channels when the codeword in the memory unit is stored in multiple channels.

12. The method of claim 8, wherein the memory mapping entry further comprises an active status for the memory unit, the active status indicating whether the memory unit is available.

13. The method of claim 8, further comprising:
determining the channel being stuck at a read data transfer or a write data transfer due to memory shortage; and
mapping more memory unit(s) to the channel to reduce channel blockage.

14. A method, comprising:
determining that a memory unit of a plurality of memory units of a storage controller is available for a channel of the storage controller, wherein the channel is configured to allow communication between the storage controller and a non-volatile storage device and the plurality of memory units are configured to provide temporary storage for encoded data to be transmitted to the non-volatile storage device through the channel or transmitted from the non-volatile storage device through the channel;
allocating the memory unit to that channel;
updating a memory mapping entry corresponding to the memory unit, wherein the memory mapping entry is stored in the storage controller;
determining the channel being stuck at a read data transfer or a write data transfer due to memory shortage; and
mapping more memory unit(s) to the channel to reduce channel blockage.

15. The method of claim 14, further comprising:
releasing the allocated memory unit by clearing a memory mapping entry corresponding to the allocated memory unit.

16. The method of claim 14, wherein the memory mapping entry further comprises an active status for the memory unit, the active status indicating whether the memory unit is available.

* * * * *